US009499092B2

(12) United States Patent
Dellock et al.

(10) Patent No.: US 9,499,092 B2
(45) Date of Patent: Nov. 22, 2016

(54) ILLUMINATING MOLDING FOR A VEHICLE

(71) Applicant: Ford Global Technologies, LLC, Dearborn, MI (US)

(72) Inventors: Paul Kenneth Dellock, Northville, MI (US); Stuart C. Salter, White Lake, MI (US); James J. Surman, Clinton Township, MI (US); Harry Lobo, Canton, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/689,152

(22) Filed: Apr. 17, 2015

(65) Prior Publication Data

US 2015/0226403 A1  Aug. 13, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *F21V 9/16* | (2006.01) |
| *B60Q 1/26* | (2006.01) |
| *B60Q 1/32* | (2006.01) |
| *H05B 37/02* | (2006.01) |

(52) U.S. Cl.
CPC ............ *B60Q 1/323* (2013.01); *B60Q 1/26* (2013.01); *B60Q 1/2611* (2013.01); *H05B 37/0218* (2013.01); *H05B 37/0227* (2013.01); *B60Q 2400/20* (2013.01); *Y02B 20/46* (2013.01)

(58) Field of Classification Search
CPC ...... B60Q 1/323; B60Q 1/26; B60Q 1/2611; H05B 37/0218; H05B 37/0227
See application file for complete search history.

(56) References Cited

U.S. PATENT DOCUMENTS

| | | |
|---|---|---|
| 5,434,013 A | 7/1995 | Fernandez |
| 5,709,453 A | 1/1998 | Krent et al. |
| 6,117,362 A | 9/2000 | Yen et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,883,926 B2 * | 4/2005 | Wojnarowski ........... B60Q 1/30 250/461.1 |
| 6,953,536 B2 | 10/2005 | Yen et al. |
| 6,990,922 B2 | 1/2006 | Ichikawa et al. |
| 7,161,472 B2 | 1/2007 | Strumolo et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — David V Bruce
(74) *Attorney, Agent, or Firm* — Jason Rogers; Price Heneveld LLP

(57) ABSTRACT

A molding for a vehicle is provided herein. The molding includes a plurality of light sources. A photoluminescent structure is configured to luminesce in response to excitation by at least a portion of the light sources. A viewable portion is illuminated by the photoluminescent structure.

18 Claims, 6 Drawing Sheets

(56) References Cited

U.S. PATENT DOCUMENTS

| | | |
|---|---|---|
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,575,349 B2 * | 8/2009 | Bucher ............ B60Q 1/302 362/231 |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 7,994,529 B2 | 8/2011 | Bierhuizen et al. |
| 8,016,465 B2 | 9/2011 | Egerer et al. |
| 8,022,818 B2 | 9/2011 | La Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| CN | 201761426 U | 3/2011 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

ILLUMINATING MOLDING FOR A VEHICLE

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a molding for a vehicle is provided. The molding includes a plurality of light sources. A photoluminescent structure is configured to luminesce in response to excitation by at least a portion of the light sources. A viewable portion is illuminated by the photoluminescent structure.

According to another aspect of the present invention, a molding for a vehicle is provided. The molding includes a plurality of light sources. A photoluminescent structure is configured to luminesce in response to excitation by at least a portion of the light sources. A viewable portion is illuminated by the photoluminescent structure. A controller is configured to control an activation state of the light sources.

According to yet another aspect of the present invention, a molding for a vehicle is provided. The molding includes a plurality of light sources. A photoluminescent structure is configured to luminesce in response to excitation by at least a portion of the light sources. A viewable portion is illuminated by the photoluminescent structure, wherein the viewable portion appears metallic when in an unilluminated state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a molding adapted to be received on a vehicle. The molding includes a light-producing assembly and at least one photoluminescent structure configured to luminesce in response to excitation from the light-producing assembly. When excited, the photoluminescent structure illuminates a viewable portion of the molding in one or more colors. While the following disclosure is directed to automobile lighting applications, it should be appreciated that the teachings provided herein may be similarly applied to lighting applications of other types of vehicles designed to transport one or more passengers such as, but not limited to, aircraft, watercraft, trains, and all-terrain vehicles (ATVs).

Figure 1:
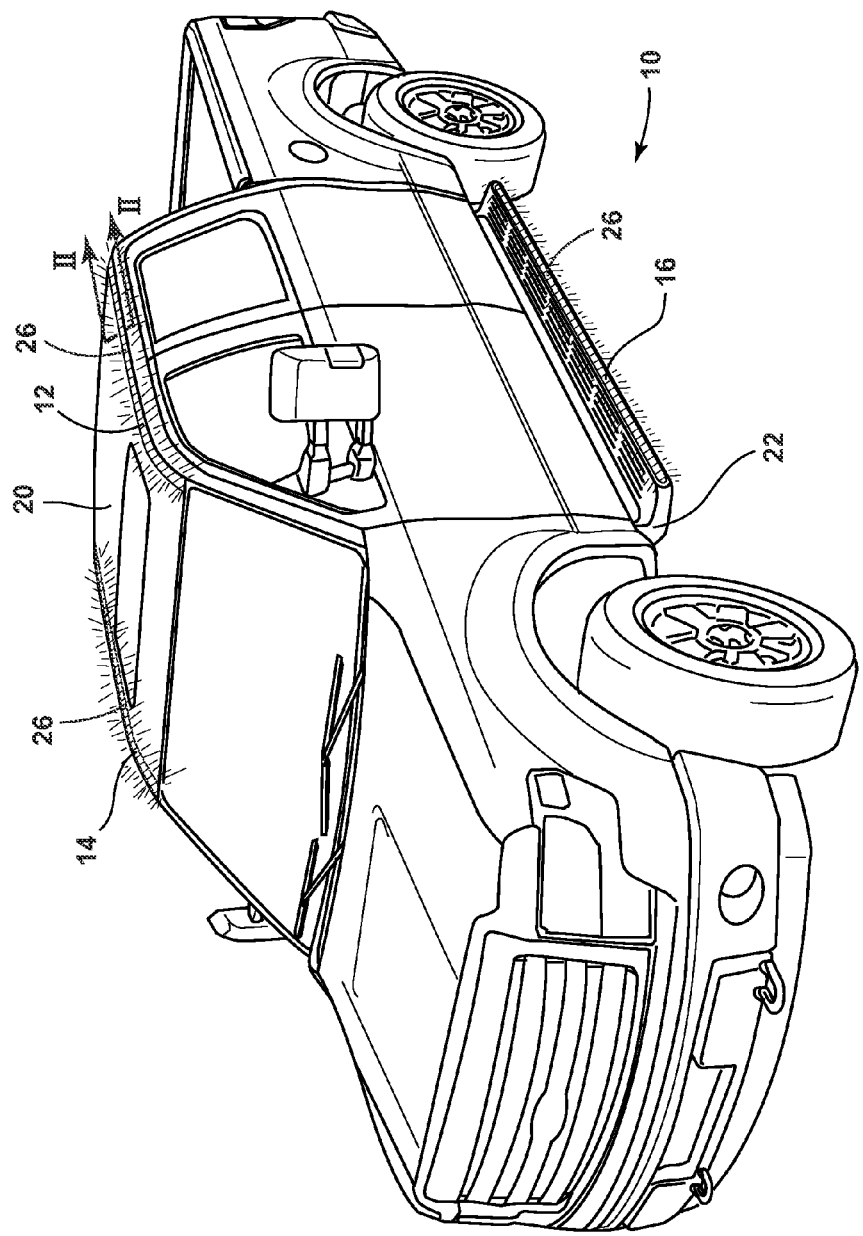
FIG. 1 is a driver-side perspective view of a vehicle equipped luminescent moldings, according to one embodiment.
Figure 2:
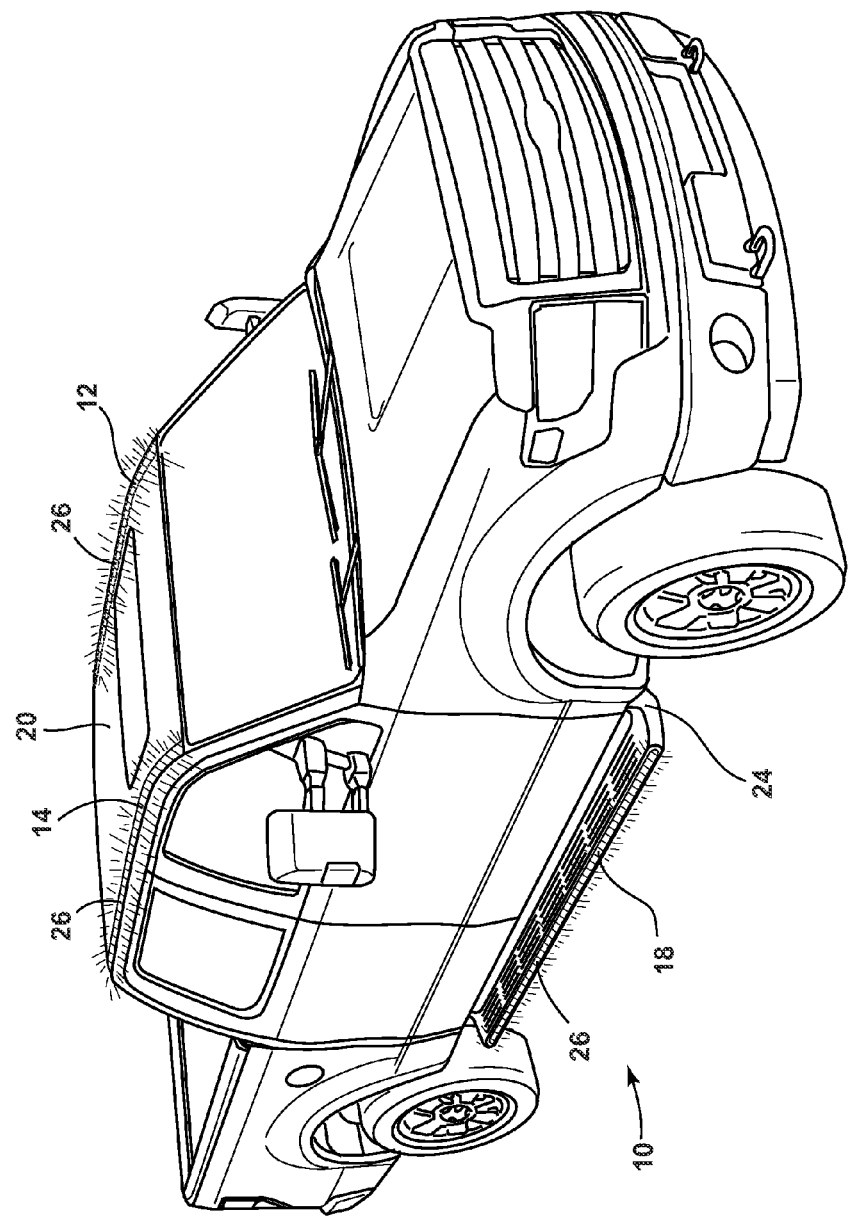
FIG. 2 is a passenger-side perspective view of a vehicle equipped with luminescent moldings, according to one embodiment.

Referring to FIGS. 1 and 2, the exterior of a vehicle 10 is generally shown according to one embodiment. The vehicle 10 includes one or more moldings, which may be decorative and/or protective. For purposes of illustration, several moldings are exemplarily shown in FIGS. 1 and 2 as moldings 12-18. Moldings 12 and 14 correspond to roof ditch moldings located on a roof structure 20 of the vehicle 10 whereas moldings 16 and 18 are each located on a corresponding running board 22, 24 positioned on a side of the vehicle 10. It should be appreciated, however, that the molding locations are not limited to those depicted in FIGS. 1 and 2, and may include other locations on the exterior as well as interior of the vehicle 10. Also, it is contemplated that other types of moldings such as side body moldings, lower body moldings, window moldings, etc. may also be constructed pursuant to the teachings provided herein. Furthermore, it should be appreciated that the moldings described herein are not limited to a particular size, shape, or length, and may have linear and/or non-linear segments to compliment the substrate on which they are located. With respect to the presently illustrated embodiment, moldings 12-18 each include a viewable portion 26 that is exposed to the operating environment of the vehicle 10 and may extend substantially the length of the molding 12-18. As described in greater detail below, the viewable portion 26 may illuminate in response to one or more vehicle-related conditions and may have a metallic appearance when in an unilluminated state.

Figure 3:
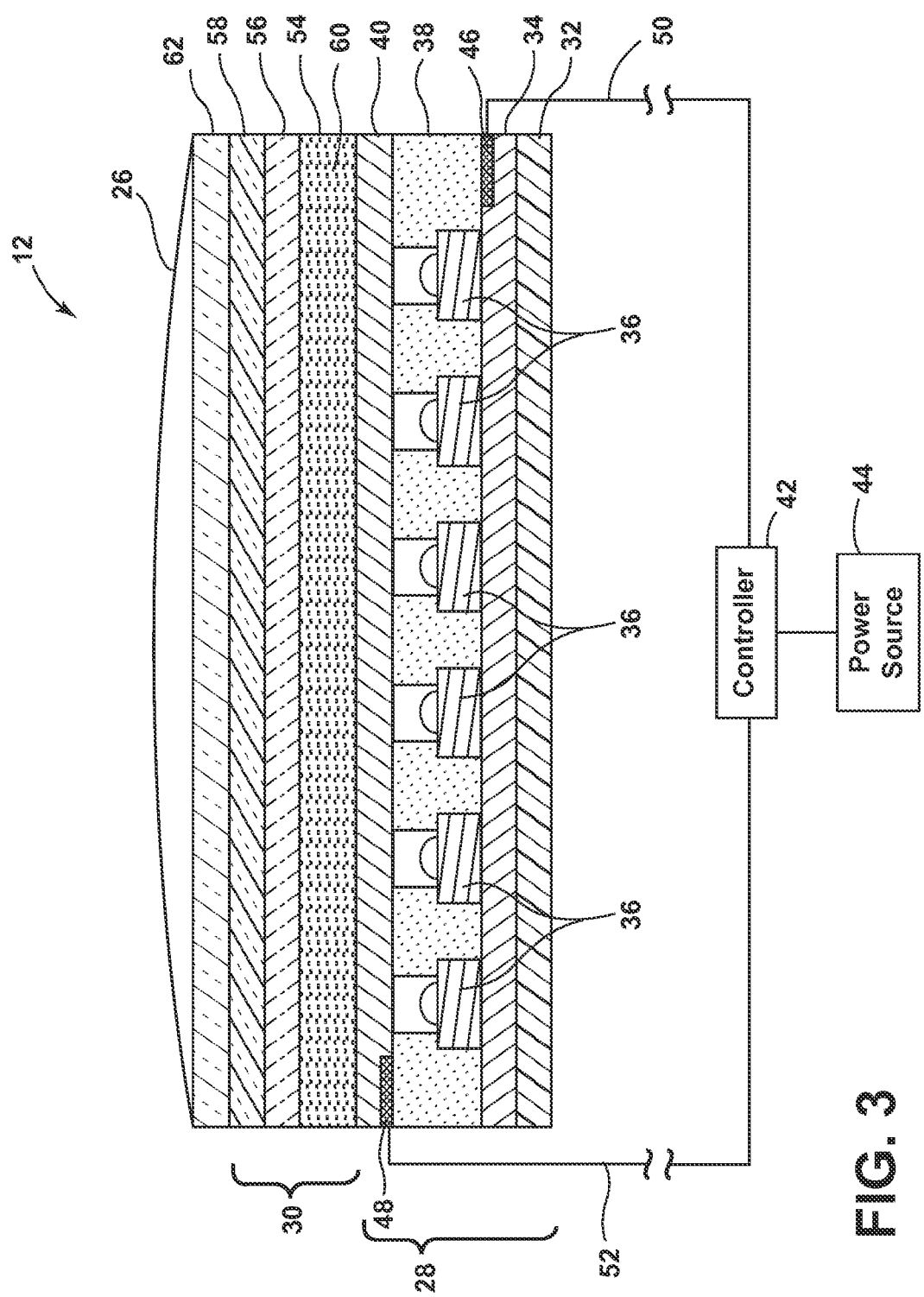
FIG. 3 is a cross-sectional view of a molding taken along line II-II of FIG. 1.

Referring to FIG. 3, a cross-sectional view of molding 12 is shown according to one embodiment. It is to be understood that moldings 14-18 or other moldings may be assembled in a similar fashion. As illustrated in FIG. 3, the molding 12 may have a stacked arrangement that includes a light-producing assembly 28, a photoluminescent structure 30, and the viewable portion 26 depicted previously in FIGS. 1 and 2.

The light-producing assembly 28 may correspond to a thin-film or printed light emitting diode (LED) assembly and includes a substrate 32 as its lowermost layer. The substrate 32 may include a polycarbonate, poly-methyl methacrylate (PMMA), polyester, polypropylene, or polyethylene terephthalate (PET) material on the order of 0.005 to 0.060 inches thick and is arranged over the intended vehicle surface on which the molding 12 is to be received. Alternatively, as a cost saving measure, the substrate 32 may directly correspond to a preexisting vehicle structure (i.e., the intended vehicle surface receiving the molding 12). For example, with respect to molding 12, the substrate 32 may correspond to an extruded aluminum roof ditch, which may additionally impart conductivity to the light-producing assembly 28.

The light-producing assembly 28 also includes a positive electrode 34 arranged over the substrate 32. The positive electrode 34 includes a conductive epoxy such as, but not limited to, a silver-containing or copper-containing epoxy. The positive electrode 34 is electrically connected to at least a portion of a plurality of LED sources 36 arranged within a semiconductor ink 38 and applied over the positive electrode 34. Likewise, a negative electrode 40 is also electrically connected to at least a portion of the LED sources 36. The negative electrode 40 is arranged over the semiconductor ink 38 and includes a transparent or translucent conductive material such as, but not limited to, indium tin oxide. Additionally, each of the positive and negative electrodes 34, 40 are electrically connected to a controller 42 and a power source 44 via a corresponding bus bar 46, 48 and conductive leads 50, 52. The bus bars 46, 48 may be printed along opposite edges of the positive and negative electrodes 34, 40 and the points of connection between the bus bars 46, 48 and the conductive leads 50, 52 may be at opposite corners of each bus bar 46, 48 to promote uniform current distribution along the bus bars 46, 48.

The LED sources 36 may be dispersed in a random or controlled fashion within the semiconductor ink 38 and may be configured to emit focused or non-focused light toward the photoluminescent structure 30. The LED sources 36 may correspond to micro-LEDs of gallium nitride elements on the order of 5 to 400 microns in size and the semiconductor ink 38 may include various binders and dielectric material including, but not limited to, one or more of gallium, indium, silicon carbide, phosphorous, and/or translucent polymeric binders. In this manner, the semiconductor ink 38 may contain various concentrations of LED sources 36 such that the density of the LED sources 36 may be adjusted for various lighting applications. In some embodiments, the LED sources 36 and semiconductor ink 38 may be sourced from Nth Degree Technologies Worldwide Inc. The semiconductor ink 38 can be applied through various printing processes, including ink jet and silk screen processes to selected portion(s) of the positive electrode 34. More specifically, it is envisioned that the LED sources 36 are dispersed within the semiconductor ink 38, and shaped and sized such that a substantial quantity of them align with the positive and negative electrodes 34, 40 during deposition of the semiconductor ink 38. The portion of the LED sources 36 that ultimately are electrically connected to the positive and negative electrodes 34, 40 may be illuminated by a combination of the bus bars 46, 48, controller 42, power source 44, and conductive leads 50, 52. According to one embodiment, the power source 44 may correspond to a vehicular power source operating at 12 to 16 VDC. Additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3, the photoluminescent structure 30 is arranged over the negative electrode 40 as a coating, layer, film or other suitable deposition. With respect to the presently illustrated embodiment, the photoluminescent structure 30 may be arranged as a multi-layered structure including an energy conversion layer 54, optional stability layer 56, and optional protection layer 58.

The energy conversion layer 54 includes at least one photoluminescent material 60 having energy converting elements with phosphorescent or fluorescent properties. For example, the photoluminescent material 60 may include organic or inorganic fluorescent dyes including rylenes, xanthenes, porphyrins, phthalocyanines. Additionally or alternatively, the photoluminescent material 60 may include phosphors from the group of Ce-doped garnets such as YAG:Ce. The energy conversion layer 54 may be prepared by dispersing the photoluminescent material 60 in a polymer matrix to form a homogenous mixture using a variety of methods. Such methods may include preparing the energy conversion layer 54 from a formulation in a liquid carrier medium and coating the energy conversion layer 54 to the negative electrode 40 or other desired substrate. The energy conversion layer 54 may be applied to the negative electrode 40 by painting, screen printing, flexography, spraying, slot coating, dip coating, roller coating, and bar coating. Alternatively, the energy conversion layer 54 may be prepared by methods that do not use a liquid carrier medium. For example, the energy conversion layer 54 may be rendered by dispersing the photoluminescent material 60 into a solid state solution (homogenous mixture in a dry state) that may be incorporated in a polymer matrix formed by extrusion, injection molding, compression molding, calendaring, thermoforming, etc.

To protect the photoluminescent material 60 contained within the energy conversion layer 54 from photolytic and thermal degradation, the photoluminescent structure 30 may include a stability layer 56. The stability layer 56 may be configured as a separate layer optically coupled and adhered to the energy conversion layer 54 or otherwise integrated therewith. The photoluminescent structure 30 may also include a protection layer 58 optically coupled and adhered to the stability layer 56 or other layer (e.g., the energy conversion layer 54 in the absence of the stability layer 56) to protect the photoluminescent structure 30 from physical and chemical damage arising from environmental exposure. The stability layer 56 and/or the protection layer 58 may be combined with the energy conversion layer 54 through sequential coating or printing of each layer, sequential lamination or embossing, or any other suitable means. Additional information regarding the construction of photoluminescent structures is disclosed in U.S. Pat. No. 8,232, 533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 60 is formulated to become excited upon receiving inputted light of a specific wavelength from at least a portion of the LED sources 36 of the light-producing assembly 28. As a result, the inputted light undergoes an energy conversion process and is re-emitted at a different wavelength. According to one embodiment, the photoluminescent material 60 may be formulated to convert inputted light into a longer wavelength light, otherwise known as down conversion. Alternatively, the photoluminescent material 60 may be formulated to convert inputted light into a shorter wavelength light, otherwise known as up conversion. Under either approach, light converted by the photoluminescent material 60 may be immediately outputted from the photoluminescent structure 30 or otherwise used in an energy cascade, wherein the converted light serves as inputted light to excite another formulation of photoluminescent material located within the energy conversion layer 54, whereby the subsequent converted light may then be outputted from the photoluminescent structure 30 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

With continued reference to FIG. 3, the viewable portion 26 is arranged over the photoluminescent structure 30. In some embodiments, the viewable portion 26 may include a plastic, silicon, or urethane material and is molded over the photoluminescent structure 30 and light-producing assembly 28. Preferably, the viewable portion 26 should be at least partially light transmissible in regards to converted light outputted from the photoluminescent structure 30. In this manner, the viewable portion 26 will be illuminated by the photoluminescent structure 30 whenever an energy conversion process is underway. Additionally, by over-molding the viewable portion 26, it may also function to protect the photoluminescent structure 30 and the light-producing assembly 28. The viewable portion 26 may be arranged in a planar shape and/or an arcuate shape to enhance its viewing potential when in a luminescent state. Like the photoluminescent structure 30 and the light-producing assembly 28, the viewable portion 26 may also benefit from a thin design, thereby helping to minimize the overall profile of the molding 12.

In some embodiments, a decorative layer 62 may be disposed between the viewable portion 26 and the photoluminescent structure 30. The decorative layer 62 may include a polymeric material or other suitable material and is configured to control or modify an appearance of the viewable portion 26 of the molding 12. For example, the decorative layer 62 may be configured to confer a metallic appearance to the viewable portion 26 when the viewable portion 26 is in an unilluminated state. In other embodiments, the decorative layer 62 may be tinted any color to complement the vehicle structure on which the molding 12 is to be received. In any event, the decorative layer 62 should be at least partially light transmissible such that the photoluminescent structure 30 is not prevented from illuminating the viewable portion 26 whenever an energy conversion process is underway.

Figure 4:
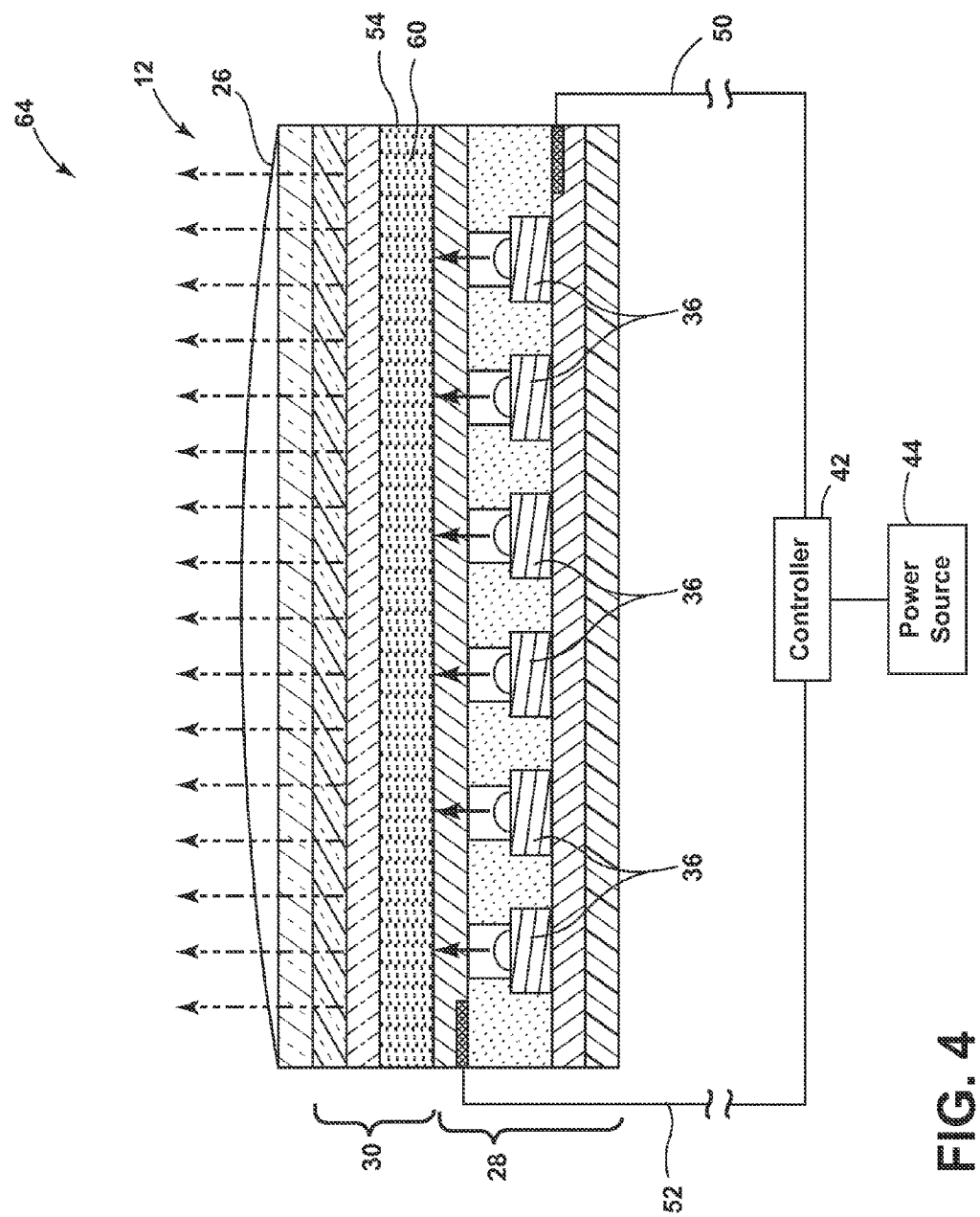
FIG. 4 illustrates an energy conversion process for generating a single color, according to one embodiment.

Referring to FIG. 4, an energy conversion process 64 for producing single color luminescence is illustrated according to one embodiment. For purposes of illustration, the energy conversion process 64 is described below using the molding 12 depicted in FIG. 3. In this embodiment, the energy conversion layer 54 of the photoluminescent structure 30 includes only photoluminescent material 60, which is configured to convert inputted light (e.g., solid arrows) received from LED sources 36 into a visible light (e.g., broken arrows) having a wavelength different than that associated with the inputted light. More specifically, the photoluminescent material 60 is formulated to have an absorption spectrum that includes the emission wavelength of the inputted light supplied from the LED sources 36. The photoluminescent material 60 is also formulated to have a Stokes shift resulting in the converted visible light having an emission spectrum expressed in a desired color, which may vary per lighting application. The converted visible light is outputted from the molding 12 via the viewable portion 26, thereby causing the viewable portion 26 to illuminate in the desired color. In one embodiment, the energy conversion process 64 is undertaken by way of down conversion, whereby the inputted light includes light on the lower end of the visibility spectrum such as blue, violet, or ultraviolet (UV) light. Doing so enables blue, violet, or UV LEDs to be used as the LED sources 36, which may offer a relative cost advantage over simply using LEDs of the desired color and foregoing the energy conversion process altogether. Furthermore, the illumination provided by the viewable portion 26 offers a unique and attractive viewing experience.

Figure 5:
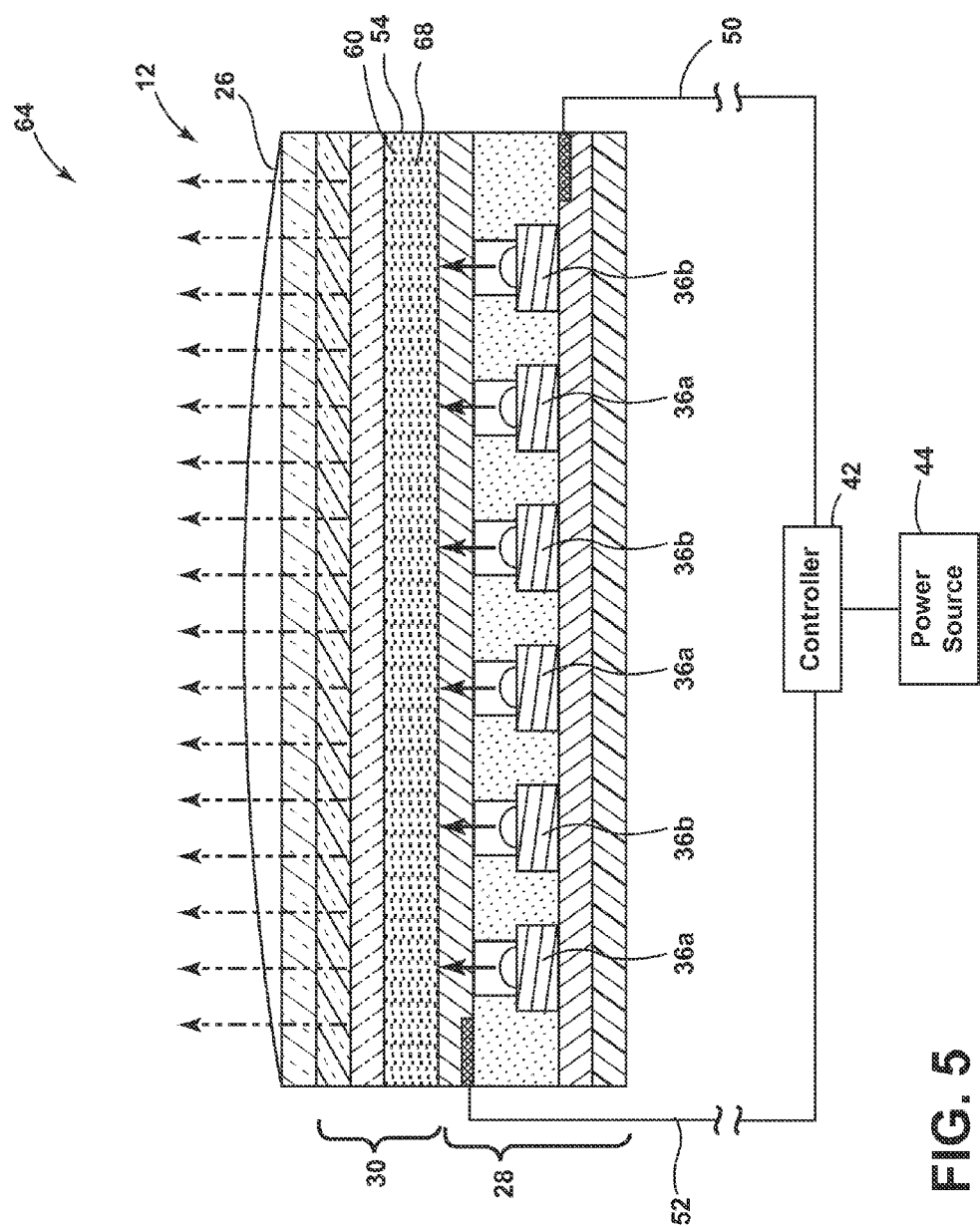
FIG. 5 illustrates an energy conversion process for generating one or more colors, according to one embodiment.

Referring to FIG. 5, an energy conversion process 66 for generating multiple colors of light is illustrated according to one embodiment. For consistency, the energy conversion process 66 is also described below using the molding 12 depicted in FIG. 3. In this embodiment, the energy conversion layer 54 includes two different photoluminescent materials 60, 68 that are interspersed within the energy conversion layer 54. Alternatively, the photoluminescent materials 60, 68 may be isolated from each other if desired. Also, it should be appreciated that the energy conversion layer 54 may include more than two different photoluminescent materials, in which case, the teachings provided below similarly apply. In one embodiment, energy conversion process 66 occurs by way of down conversion using blue, violet, and/or UV light as the source of excitation.

With respect to the presently illustrated embodiment, the excitation of photoluminescent materials 60 and 68 are mutually exclusive. That is, photoluminescent materials 60 and 68 are formulated to have non-overlapping absorption spectrums and Stoke shifts that yield different emission spectrums. Also, in formulating the photoluminescent materials 60, 68, care should be taken in choosing the associated Stoke shifts such that the converted light emitted from one of the photoluminescent materials 60, 68 does not excite the other, unless so desired. According to one exemplary embodiment, a first portion of the LED sources 36, exemplarily shown as LED sources 36a, is configured to emit an inputted light having an emission wavelength that only excites photoluminescent material 60 and results in the inputted light being converted into a visible light of a first color. Likewise, a second portion of the LED sources 36, exemplarily shown as LED sources 36b, is configured to emit an inputted light having an emission wavelength that only excites photoluminescent material 68 and results in the inputted light being converted into a visible light of a second color. Preferably, the first and second colors are visually distinguishable from one another. In this manner, LED sources 36a and 36b may be selectively activated using the controller 42 to cause the photoluminescent structure 30 to luminesce in a variety of colors. For example, the controller 42 may activate only LED sources 36a to exclusively excite photoluminescent material 60, resulting in the viewable portion 26 illuminating in the first color. Alternatively, the controller 42 may activate only LED sources 36b to exclusively excite photoluminescent material 68, resulting in the viewable portion 26 illuminating in the second color. Alternatively still, the controller 42 may activate LED sources 36a and 36b in concert, which causes both of the photoluminescent materials 60, 68 to become excited, resulting in the viewable portion 26 illuminating in a third color, which is a color mixture of the first and second color. For energy conversion layers containing more than two distinct photoluminescent materials, a greater diversity of colors may be achieved. Contemplated colors include red, green, blue, and combinations thereof including white, all of which may be achieved by selecting the appropriate photoluminescent materials and correctly manipulating their corresponding LED sources.

Figure 6:
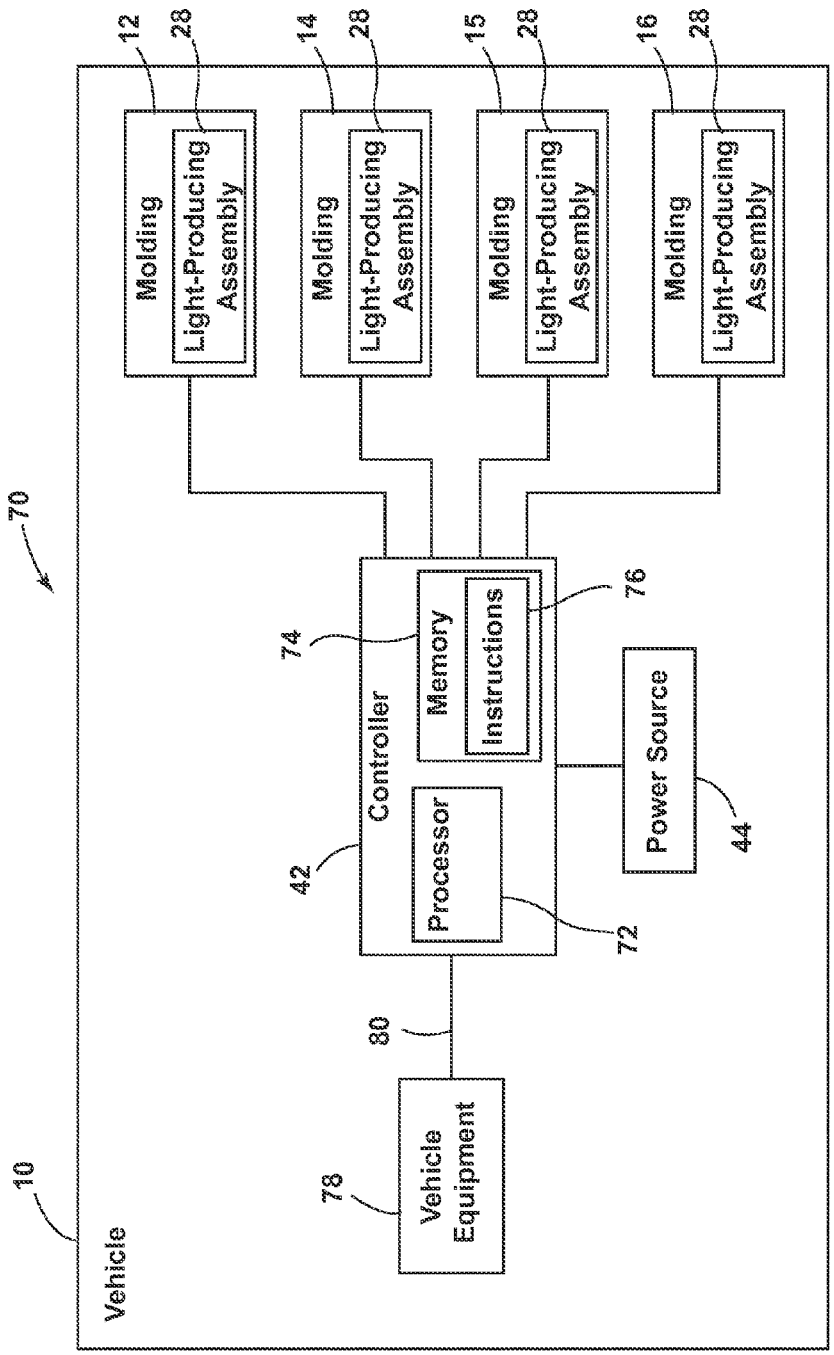
FIG. 6 is a block diagram of a vehicle lighting system employing the moldings depicted in FIGS. 1 and 2, according to one embodiment.

Referring to FIG. 6, a plan view of a lighting system 70 is shown according to one embodiment. For purposes of illustration, the vehicle lighting system 70 includes moldings 12-18 depicted previously in FIGS. 1 and 2, but may include more or less moldings in other embodiments. Each molding 12-18 may be arranged similar to the molding 12 depicted in FIG. 3 and may employ one of the energy conversion processes 64, 66 depicted in FIGS. 4 and 5. That is, it is to be understood that a given molding 12-18 may be configured to luminesce in one or more colors. Furthermore, it is to be understood that a given molding 12-18 may luminesce in a variety of patterns depending on the light transmittance properties of the viewable portion 26, the arrangement of the photoluminescent structure 30 within the particular molding 12-18, and/or the manner in which the photoluminescent material(s) is distributed within the energy conversion layer 54 of the photoluminescent structure 30.

In operation, the LEDs 36 of the light-producing assembly 28 of each molding 12-18 is selectively controlled by one or more controllers. As exemplarily shown in FIG. 6, a controller 42 corresponding to that depicted in FIG. 3 is electrically connected to the light-producing assembly 28 of each molding 12-18 and a power source 44, which may correspond to a vehicular power source operating at 12 to 16 VDC. The controller 42 may be variously located within the vehicle 10 and includes a processor 72 in communication with a memory 74. The memory 74 includes instructions 76 stored thereon that are executable by the processor 72. The instructions 76 relate to controlling an activation state of the LEDs 36 of the light-producing assembly 28 associated with each of the moldings 12-18 and enable the controller 42 to selectively activate at least a portion of the LED sources 36 for the light-producing assembly 28 of a given molding 12-18. The controller 42 may be communicatively coupled to one or more vehicle equipment 78 and use signals received therefrom to control the activation state of each light-producing assembly 28. The controller 42 may communicate with the one or more vehicle equipment 78 over a communication bus 80 of the vehicle 10 and may receive signals directed to a vehicle-related condition such as, but not limited to, an operational state of the vehicle 10, a door open status, a key fob proximity status, a remote signal sourced from a portable electronic device, an ambient light level, or any other information or control signal that may be utilized to activate or otherwise adjust the output of a given light-producing assembly 28.

When a given light-producing assembly 28 is activated, the controller 42 may control the light emission intensity of the LEDs 36 of the light-producing assembly 28 to affect the brightness in which the corresponding photoluminescent structure 30 luminesces. For example, the controller 42 may control the intensity of a given light-producing assembly 28 through pulse-width modulation or direct current control. Additionally or alternatively, the controller 42 may control the light emission duration of at least a portion of the LEDs 36 of a given light-producing assembly 28 to affect the duration in which the viewable portion 26 illuminates. For example, the controller 42 may keep at least a portion of the LEDs 36 of a given light-producing assembly 28 activated for an extended duration such that at least a portion of the viewable portion 26 of the corresponding molding 12-18 exhibits sustained illumination. Alternatively, the controller 42 may flash at least a portion of the LEDs 36 of a given light-producing assembly 28 at varying time intervals such that at least a portion of the viewable portion 26 of the corresponding molding 12-18 exhibits a blinking effect. In some embodiments, the controller 42 may activate certain portions of the LED sources 36 at different times to produce various colors and/or light patterns across the viewable portion 26 of the corresponding molding 12-18.

According to one embodiment, the controller 42 may control any of the light-producing assemblies 28 such that the corresponding molding 12-18 exhibits a substantially bright level of illumination when the vehicle 10 is in park and one or more of the doors become unlocked and/or opened to provide lighting to vehicle occupants entering or leaving the vehicle 10. Once the doors are locked and/or closed, the controller 42 may deactivate any of the currently active light-producing assemblies 28 or otherwise control any of the light-producing assemblies 28 such that the corresponding molding 12-18 exhibits a different (e.g., decreased) level of illumination.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A molding for a vehicle, comprising:
   a plurality of light sources configured as printed LEDs;
   a photoluminescent structure configured to luminesce in response to excitation by at least a portion of the light sources; and
   a viewable portion illuminated by the photoluminescent structure.

2. The molding of claim 1, wherein the photoluminescent structure comprises at least one photoluminescent material configured to down convert an inputted light received from at least a portion of the light sources into a visible light that is outputted to the viewable portion.

3. The molding of claim 2, wherein the inputted light comprises one of a blue light, violet light, and a UV light.

4. The molding of claim 1, further comprising a decorative layer disposed between the photoluminescent structure and the viewable portion, wherein the decorative layer is at least partially light transmissible and confers a metallic appearance to the viewable portion when the viewable portion is in an unilluminated state.

5. The molding of claim 1, further comprising a controller for controlling an activation state of the plurality of light sources in response to at least one vehicle-related condition.

6. The molding of claim 5, wherein the controller determines at least one of a light emission intensity and a light emission duration of each of the plurality of light sources.

7. A molding for a vehicle, comprising:
a plurality of light sources arranged as printed LEDs;
a photoluminescent structure configured to luminesce in response to excitation by at least a portion of the light sources;
a viewable portion illuminated by the photoluminescent structure; and
a controller configured to control an activation state of the light sources.

8. The molding of claim 7, wherein the photoluminescent structure comprises at least one photoluminescent material configured to down convert an inputted light received from at least a portion of the plurality of LED sources into a visible light that is outputted to the viewable portion.

9. The molding of claim 8, wherein the inputted light comprises one of a blue light, violet light, and a UV light.

10. The molding of claim 7, further comprising a decorative layer disposed between the photoluminescent structure and the viewable portion, wherein the decorative layer is at least partially light transmissible and confers a metallic appearance to the viewable portion when the viewable portion is in an unilluminated state.

11. The molding of claim 7, wherein the controller determines at least one of a light emission intensity and a light emission duration of each of the light sources.

12. A molding for a vehicle, comprising:
a plurality of light sources;
a photoluminescent structure configured to luminesce in response to excitation by at least a portion of the light sources; and
a viewable portion illuminated by the photoluminescent structure, wherein the viewable portion appears metallic when in an unilluminated state.

13. The molding of claim 12, wherein the light sources are arranged as printed LEDs.

14. The molding of claim 13, wherein the photoluminescent structure comprises at least one photoluminescent material configured to down convert an inputted light received from at least a portion of the light sources into a visible light that is outputted to the viewable portion.

15. The molding of claim 14, wherein the inputted light comprises one of a blue light, violet light, and a UV light.

16. The molding of claim 12, further comprising a decorative layer disposed between the photoluminescent structure and the viewable portion, wherein the decorative layer is at least partially light transmissible and confers the metallic appearance to the viewable portion.

17. The molding of claim 12, further comprising a controller for controlling an activation state of the light sources in response to at least one vehicle-related condition.

18. The molding of claim 17, wherein the controller determines at least one of a light emission intensity and a light emission duration of each of the light sources.

* * * * *